United States Patent
Huang et al.

(10) Patent No.: US 11,997,227 B2
(45) Date of Patent: May 28, 2024

(54) ELECTRONIC DEVICE

(71) Applicant: PEGATRON CORPORATION, Taipei (TW)

(72) Inventors: Chin-Ting Huang, Taipei (TW); Hsiao-Wen Wu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 316 days.

(21) Appl. No.: 17/522,626

(22) Filed: Nov. 9, 2021

(65) Prior Publication Data
US 2022/0210255 A1 Jun. 30, 2022

(30) Foreign Application Priority Data
Dec. 29, 2020 (TW) .................... 109146654

(51) Int. Cl.
*H01Q 1/38* (2006.01)
*H01Q 1/24* (2006.01)
*H04M 1/02* (2006.01)

(52) U.S. Cl.
CPC .......... *H04M 1/0277* (2013.01); *H01Q 1/243* (2013.01)

(58) Field of Classification Search
None
See application file for complete search history.

(56) References Cited

U.S. PATENT DOCUMENTS

| | | | | |
|---|---|---|---|---|
| 5,563,616 A | * | 10/1996 | Dempsey | H01Q 9/285 343/756 |
| 7,339,532 B2 | * | 3/2008 | Park, II | H01Q 1/243 343/702 |
| 8,421,693 B2 | * | 4/2013 | Ohshima | H01Q 1/42 343/713 |
| 9,509,058 B2 | * | 11/2016 | Matsumura | H01L 21/56 |
| 9,716,318 B2 | * | 7/2017 | Shirley | H01Q 9/0407 |
| 9,966,707 B2 | * | 5/2018 | Hildebrand | H01Q 1/1242 |
| 10,873,127 B2 | * | 12/2020 | Choi | H01Q 9/0414 |
| 2004/0227676 A1 | * | 11/2004 | Kim | H01Q 1/088 343/702 |
| 2008/0068268 A1 | * | 3/2008 | Kowalewicz | H01Q 19/005 343/700 MS |

FOREIGN PATENT DOCUMENTS

| | | |
|---|---|---|
| CN | 205219901 | 5/2016 |
| CN | 109037918 | 12/2018 |
| CN | 111478021 | 7/2020 |

\* cited by examiner

*Primary Examiner* — Tuan A Tran
(74) *Attorney, Agent, or Firm* — J.C. PATENTS

(57) ABSTRACT

An electronic device including a casing, a circuit board, a bracket, an antenna, and a protective member is provided. The casing has an accommodating space and a hole communicating with the accommodating space. The circuit board is disposed in the accommodating space. The bracket is disposed above the circuit board, and at least part of the bracket is located in the accommodating space and the hole. At least part of the antenna is disposed on a portion of the bracket extending out of the accommodating space. The protective member is disposed on at least one surface of the casing and covers the hole, the bracket, and the antenna.

10 Claims, 2 Drawing Sheets

ELECTRONIC DEVICE

CROSS-REFERENCE TO RELATED APPLICATION

This application claims the priority benefit of Taiwan application serial no. 109146654, filed on Dec. 29, 2020. The entirety of the above-mentioned patent application is hereby incorporated by reference herein and made a part of this specification.

BACKGROUND

Technology Field

The disclosure relates to an electronic device, particularly to an electronic device having an antenna.

Description of Related Art

Currently, 4G LTE and 5G Sub-6G frequency bands cover a range from 617 MHz to 5000 MHz. In terms of antenna design, in order to cover broadband and high antenna efficiency, it is necessary to increase the distance between the antenna and the circuit board to reduce the capacitance effect between the antenna and the ground plane of the circuit board, reducing the probability of radiant energy being stored between the antenna and the ground plane, thereby improving antenna efficiency. However, increasing the distance between the antenna and the circuit board also causes the electronic product to become thicker.

SUMMARY

The present disclosure provides an electronic device having a thinner overall thickness and a larger distance between an antenna and a circuit board.

An electronic device of the present disclosure includes a casing, a circuit board, a bracket, an antenna, and a protective member. The casing has an accommodating space and a hole communicating with the accommodating space. The circuit board is disposed in the accommodating space. The bracket is disposed above the circuit board, and at least part of the bracket is located in the accommodating space and the hole. At least part of the antenna is disposed on a portion of the bracket extending out of the accommodating space. The protective member is disposed on at least one surface of the casing and covers the hole, the bracket, and the antenna.

In an embodiment of the present disclosure, a top surface of the bracket has the same height as an outer surface of the casing does, and at least part of the antenna is disposed on the top surface.

In an embodiment of the present disclosure, a top surface of the bracket protrudes from an outer surface of the casing, and at least part of the antenna is disposed on the top surface.

In an embodiment of the present disclosure, a part of a top surface of the bracket protrudes from an outer surface of the casing, and at least part of the antenna is disposed on the part of the top surface.

In an embodiment of the present disclosure, the size of the hole of the casing is greater than or equal to the size of the bracket.

In an embodiment of the present disclosure, the shape of the hole of the casing corresponds to the shape of the bracket.

In an embodiment of the present disclosure, the bracket, casing, and protective member as mentioned are insulated and are made of different materials.

In an embodiment of the present disclosure, the casing includes a first casing wall and a second casing wall opposite to each other, the circuit board is close to the first casing wall, the hole is formed in the second casing wall, and the projection of the circuit board on the second casing wall covers the hole.

In an embodiment of the present disclosure, the protective member is flexible or compressible, and the material of the protective member includes foam, silicone, or rubber.

In an embodiment of the present disclosure, the thickness of the protective member is 2.5 mm or more.

Based on the above, the electronic device of the present disclosure is configured with a hole on the casing, so that part of the bracket may extend out of the accommodating space. The antenna is at least partially disposed on a portion of the bracket that extends out of the accommodating space. This design increases the distance between the antenna and the circuit board in the accommodating space to reduce the capacitance effect. Furthermore, the protective member disposed on the casing to cover the hole, the bracket, and the antenna protects the electronic device and the antenna, and gives the electronic device a neat appearance.

DESCRIPTION OF THE EMBODIMENTS

Figure 1:
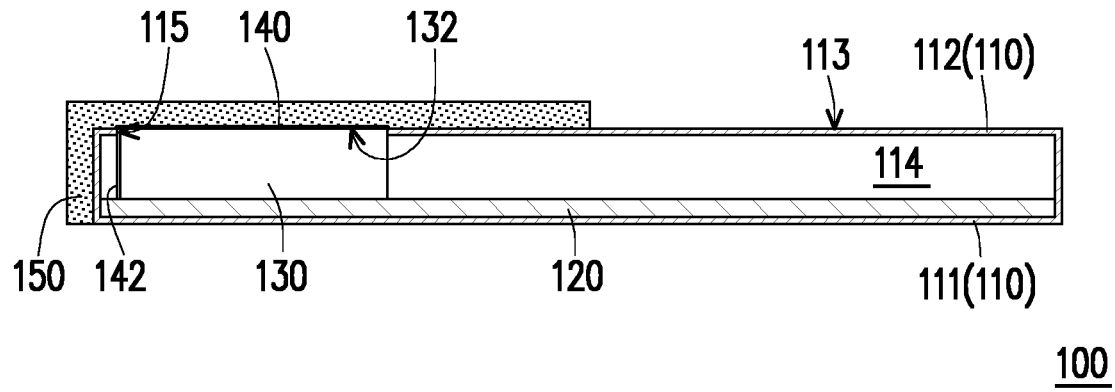
FIG. 1 is a schematic cross-sectional view of an electronic device according to an embodiment of the disclosure.

FIG. 1 is a schematic cross-sectional view of an electronic device according to an embodiment of the disclosure. In FIG. 1, in this embodiment, an electronic device 100 includes a casing 110, a circuit board 120, a bracket 130, an antenna 140, and a protection member 150.

The casing 110 has an accommodating space 114 and a hole 115 communicating with the accommodating space 114. In this embodiment, the casing 110 includes a first casing wall 111 and a second casing wall 112 opposite to each other. The first casing wall 111 is, for example, a bottom wall, whereas the second casing wall 112 is, for example, a top wall. Of course, the first casing wall 111 and the second casing wall 112 may also be two side walls opposite to each other, but it is not limited thereto. The hole 115 is formed in the second casing wall 112. In this embodiment, the material of the casing 110 is, for example, an insulating material, such as plastic, and the thickness of the casing 110 is about 1 mm to 2.5 mm, but it is not limited thereto.

The circuit board 120 is disposed in the accommodating space 114. The circuit board 120 is close to the first casing wall 111. The circuit board 120 is, for example, directly disposed on the first casing wall 111, but a gap may exist between the circuit board 120 and the first casing wall 111 such that they are not in direct contact. The circuit board 120 has a ground plane (not shown), which may be adopted as a system ground plane of the antenna 140.

In this embodiment, the projection of the circuit board 120 onto the second casing wall 112 overlaps the hole 115. In one embodiment, the projection of the ground plane (not shown) of the circuit board 120 onto the second casing wall 112 overlaps the hole 115. In other words, the position of the hole 115 may correspond to the position of the ground plane of the circuit board 120.

The bracket 130 is disposed above the circuit board 120. In this embodiment, the bracket 130 is, for example, disposed on the circuit board 120, but in other embodiments, a gap may exist between the bracket 130 and the circuit board 120 such that it is not in direct contact with the circuit board 120.

At least part of the bracket 130 is located in the accommodating space 114 and the hole 115. As can be seen from FIG. 1, in this embodiment, the bracket 130 is not only located in the accommodating space 114, it also extends towards the hole 115 of the second casing wall 112 of the casing 110, such that a top surface 132 of the bracket 130 has the same height as an outer surface 113 of the second wall 112 of the casing 110 does. Of course, in other embodiments, the top surface 132 of the bracket 130 may be higher than the outer surface 113 of the second casing wall 112 of the casing 110, or is slightly lower than the outer surface 113 of the second casing wall 112 of the casing 110 (but it is higher than the inner surface of the second casing wall 112).

In this embodiment, the size of the hole 115 of the casing 110 is equal to the size of the bracket 130, and the shape of the hole 115 of the casing 110 corresponds to the shape of the bracket 130 to reduce the probability that the casing 110 exposes components other than the bracket 130. Of course, in other embodiments, the size of the hole 115 of the casing 110 may be larger than the size of the bracket 130 to ensure that the bracket 130 is fully exposed, or may be applied to other bracket 130 in different shapes and sizes. Or, in other embodiments, if the bracket 130 only partially protrudes, the size of the hole 115 of the casing 110 may be smaller than the size of the bracket 130 as the size of the hole 115 of the casing 110 only needs to be larger than the part where the bracket 130 is exposed from the casing 110.

At least part of the antenna 140 is disposed on a portion of the bracket 130 extending out of the accommodating space 114. In this embodiment, the antenna 140 is disposed on the top surface 132 of the bracket 130 and is located outside the accommodating space 114. In other embodiments, a part of the antenna 140 may be disposed on other surfaces of the bracket 130, and the part of the antenna 140 disposed on the top surface 132 of the bracket 130 may be located outside the accommodating space 114.

It can be seen from the above description that the electronic device 100 is provided with the hole 115 on the casing 110, so that part of the bracket 130 may extend out of the accommodating space 114, and that it is possible for the antenna 140 to be disposed on a portion of the bracket 130 extending out of the accommodating space 114 and be located outside the accommodating space 114. Therefore, the position of the antenna 140 does not need to be restricted by the height of the casing 110.

In this way, the electronic device 100 may still increase the distance between the antenna 140 and the circuit board 120 in the accommodating space 114 with the premise that the casing 110 remains thin, to achieve the technical effect of reducing the capacitance effect. Specifically, the distance between the antenna 140 and the circuit board 120 may be increased by at least 1 mm to 2.5 mm, such that the antenna characteristics may be improved.

In addition, in this embodiment, the antenna 140 may be electrically connected to the circuit board 120 through a wire 142. The wire 142 is, for example, a coaxial transmission line, of which the positive terminal (not shown) connects the feeding terminal of the antenna 140 to the wireless module (not shown) of the circuit board 120, and the negative terminal (not shown) connects the ground terminal of the antenna 140 to the ground plane of the circuit board 120. Of course, the electrical connection between the antenna 140 and the circuit board 120 is not limited thereto.

Furthermore, in this embodiment, the number of the bracket 130 and the number of the antenna 140 are both one. However, in other embodiments, the number of the bracket 130 and the antenna 140 may be multiple, and the number of the hole 115 of the casing 110 may be increased correspondingly.

In addition, in order to pass the strict industrial mobile-phone drop standard, in this embodiment, the electronic device 100 achieves the anti-collision function by adhering the protective member 150 onto the outside of the casing 110. The protective member 150 is flexible or compressible, and the material of the protective member 150 includes foam, silicone, or rubber, and the thickness of the protective member 150 may be 2.5 mm or more.

The protective member 150 is disposed on at least one surface of the casing 110 and covers the hole 115, the bracket 130, and the antenna 140. Therefore, in addition to protecting the electronic device 100 when it falls, the protective member 150 also protects the antenna 140 and gives the electronic device 100 a neat appearance.

In this embodiment, the protective member 150 is not only provided on the second casing wall 112 but also on the side wall of the casing 110. Of course, in other embodiments, the protective member 150 may cover the entire casing 110 or other parts of the casing 110, and is not limited to the drawings.

It is worth mentioning that the bracket 130 and the casing 110 are insulated and mad of different materials. In this embodiment, the bracket 130 may be an insulating material for laser direct structuring (LDS). The manufacturer may form the antenna 140 on the insulating material by means of LDS. In this embodiment, the hole 115 is provided on the casing 110, so that part of the bracket 130 can extend out of the accommodating space 114, and it is not necessary to form the antenna on the casing 10, the antenna 140 may be at a height higher than or equal to the top surface 132 of the casing 110. Since the antenna 140 is not disposed on the casing 110, the casing 110 does not need to adopt the expensive, special insulating materials of LDS, but uses general plastics that saves costs.

Figure 2:
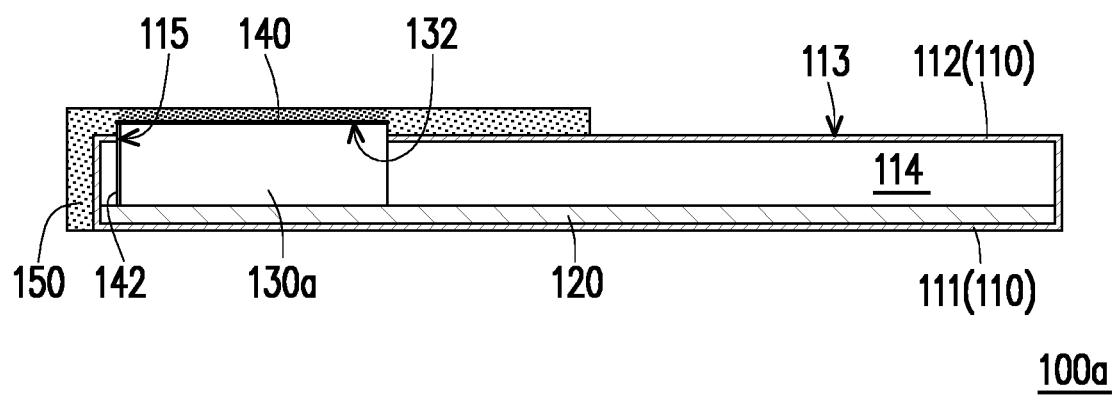
FIG. 2 is a schematic cross-sectional view of an electronic device according to another embodiment of the disclosure.

FIG. 2 is a schematic cross-sectional view of an electronic device according to another embodiment of the disclosure. In FIG. 2, the main difference between the electronic device 100a of this embodiment and the electronic device 100 of FIG. 1 is that, in this embodiment, a top surface 132 of the bracket 130a protrudes from an outer surface 113 of a casing 110. Therefore, the antenna 140 disposed on the top surface 132 of the bracket 130a has a greater distance from the circuit board 120. In addition, since the protective member 150 is flexible, the part of the protective member 150 corresponding to the bracket 130a and the antenna 140 may be compressed, and the overall appearance of the protective member 150 may still remain intact.

Figure 3:
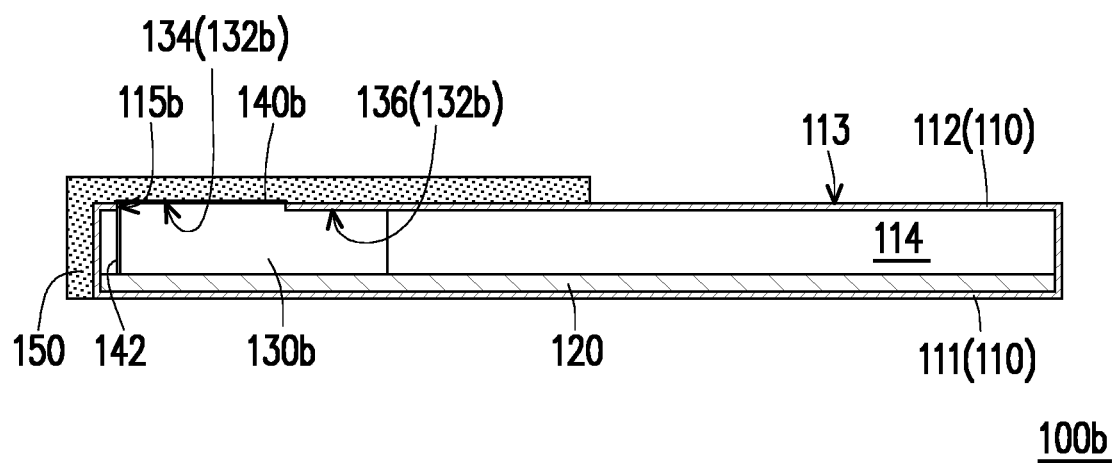
FIG. 3 is a schematic cross-sectional view of an electronic device according to yet another embodiment of the disclosure.

FIG. 3 is a schematic cross-sectional view of an electronic device according to yet another embodiment of the disclosure. In FIG. 3, the main difference between the electronic device 100b of this embodiment and the electronic device 100 of FIG. 1 is that: in this embodiment, a part 134 of a top surface 132b of a bracket 130b protrudes from an outer surface 113 of a casing 110, and another part 136 of the top surface 132b of the bracket 130b is located in an accommodating space 114. The size of the hole 115b on a second wall 112 of the casing 110 corresponds to the size of the part 134 of the top surface 132b of the bracket 130b. At least one part of the antenna 140b (for example, the whole antenna 140b, but not limited hereto) is disposed on the part 134 of the top surface 132b of the bracket 130b, which is exposed from the casing 110, such that it has a larger distance from the circuit board 120.

In summary, the electronic device of the present disclosure is provided with a hole on the casing, so that part of the bracket can extend out of the accommodating space and at least a part of the antenna is disposed on a portion of the bracket that extends out of the accommodating space. This design increases the distance between the antenna and the circuit board in the accommodating space, reducing the capacitance effect. Furthermore, the protective member disposed on the casing and covering the hole, the bracket, and the antenna protects the electronic device and the antenna, and gives the electronic device a neat appearance.

What is claimed is:

1. An electronic device, comprising:
   a casing, having an accommodating space and a hole communicating with the accommodating space;
   a circuit board, disposed in the accommodating space;
   a bracket, disposed above the circuit board, wherein at least part of the bracket is located in the accommodating space and the hole;
   an antenna, wherein at least part of the antenna is disposed on a portion of the bracket extending out of the accommodating space; and
   a protective member, disposed on at least one surface of the casing and covering the hole, the bracket, and the antenna.

2. The electronic device according to claim 1, wherein a top surface of the bracket has the same height as an outer surface of the casing does, and the at least part of the antenna is disposed on the top surface.

3. The electronic device according to claim 1, wherein a top surface of the bracket protrudes from an outer surface of the casing, and the at least part of the antenna is disposed on the top surface.

4. The electronic device according to claim 1, wherein a part of a top surface of the bracket protrudes from an outer surface of the casing, and the at least part of the antenna is disposed on the part of the top surface.

5. The electronic device according to claim 1, wherein a size of the hole of the casing is greater than or equal to a size of the bracket.

6. The electronic device according to claim 1, wherein a shape of the hole of the casing corresponds to a shape of the bracket.

7. The electronic device according to claim 1, wherein the bracket, the casing, and the protective member are insulated and made of different materials.

8. The electronic device according to claim 1, wherein the casing comprises a first casing wall and a second casing wall opposite to each other, the circuit board is close to the first casing wall, the hole is formed in the second casing wall, and a projection of the circuit board onto the second casing wall overlaps the hole.

9. The electronic device according to claim 1, wherein the protective member is flexible or compressible, and a material of the protective member comprises foam, silicone, or rubber.

10. The electronic device according to claim 1, wherein a thickness of the protective member is 2.5 mm or more.

* * * * *